United States Patent [19]

Wakabayashi et al.

[11] Patent Number: 4,509,001
[45] Date of Patent: Apr. 2, 1985

[54] BRUSHLESS LINEAR SERVOMOTOR

[75] Inventors: Noriaki Wakabayashi; Terumichi Fukumoto, both of Hirakata; Nobuhiro Ueda, Neyagawa, all of Japan

[73] Assignee: Matsushita Electric Industrial Co., Ltd., Kadoma, Japan

[21] Appl. No.: 472,123

[22] Filed: Mar. 4, 1983

[51] Int. Cl.³ .............................................. G05B 11/00
[52] U.S. Cl. .................................. 318/687; 318/135; 318/640; 318/608
[58] Field of Search ................. 318/687, 640, 135, 608

[56] References Cited

U.S. PATENT DOCUMENTS

| | | | |
|---|---|---|---|
| 3,268,747 | 8/1966 | Snowdon | 318/135 X |
| 3,457,482 | 7/1969 | Sawyer | 318/687 X |
| 3,829,746 | 8/1974 | Van et al. | 318/135 |
| 3,857,078 | 12/1974 | Sawyer | 318/687 X |
| 3,867,676 | 2/1975 | Chai et al. | 318/135 |
| 4,044,881 | 8/1977 | Chai et al. | 197/82 |
| 4,075,539 | 2/1978 | Wada | 318/135 |
| 4,230,978 | 10/1980 | Gardella et al. | 318/687 |

Primary Examiner—B. Dobeck
Attorney, Agent, or Firm—Wenderoth, Lind & Ponack

[57] ABSTRACT

A brushless linear servomotor utilizes a first member provided with magnetic teeth having a large number of teeth-salients and slots arranged lengthwise of the first member at regular pitches and a second member which is moveable along the first member and has at least one magnetic core with magnetic teeth groups engraved thereon at surfaces opposite to the first member, and having a coil wound around each of the magnetic cores and further having a guide arranged to keep a constant gap between the first and second members. A number of non-contact detectors are connected to the second member so as to detect the salients and slots of the magnetic teeth of the first member. An electronic commutator and an electronic scale circuit are both connected to the non-contact detectors. The electronic scale means generates signals indicative of the relative position of the two members and a motor driving circuit is connected to each of the coils and the electronic commutator so as to operate the motor in response to the electronic commutator.

5 Claims, 17 Drawing Figures

BRUSHLESS LINEAR SERVOMOTOR

BACKGROUND OF THE INVENTION

1. Field of the Invention

This invention relates to a brushless (non-contact) linear servomotor capable of performing speed control and position control with extremely high accuracy, and more particularly to a non-contact system linear servomotor which directly linear-drives a controlled object and eliminates any contact.

The present invention is applicable typically to a driving apparatus including a drive mechanism for a pen block in automatic drafting equipment, such as a XY plotter, a drive mechanism for a pen block in a recording instrument, such as a XY recorder or a strip-chart recorder, or a feeding mechanism for a printing head in a printing machine, such as a line printer, these mechanisms performing a linear movement at a high speed and with a high accuracy

2. Description of the Prior Art

Conventionally, the aforesaid apparatus have most usually adopted to drive mechanism which employs a rotary type stepping motor or a rotary type servomotor to move the controlled object linearly through gears, rollers, pulleys and wires.

In a case of using such a mechanism, however, its obtainable performance has a fixed limit to be discussed below, so that, when an engineer has intended to use it beyond the limit, he has been obliged to suddenly confront a difficult condition regarding techniques and manufacturing costs.

The first limit concerns the physical accuracy of position, linearity and reproducibility. For example, gears always include a certain backlash and dead zone and pulleys include a slip. The longer the wire is, the worse its influence on the accuracy by its expansion and contraction. The rotary type stepping motor is not of a closed loop control (the so-called open loop control) so that an eccentricity of a gear has a delicate influence on the linearity and also a fatal problem may be created in that the motor when intended to run at high speed, is apt to cause a step-out in the transient state. While, in a case of using the rotary type servomotor, a linear potentiometer is often used at the point of action (the controlled object) to realize the closed loop control to thereby lessen the factor of accuracy deterioration, but the linear potentiometer anew causes the accuracy deterioration. The linear potentiometer now widely in use comprises resistors of a wound type or a conductive plastic type and contact brushes so that its accuracy depends largely on the non-linearity of the resistor, hysteresis and backlash of the brush, and wear of the resistor.

The second limit concerns the reliability such as the durability of lifetime. The aforesaid transmission system includes a force transmitting member using a frictional resistance as an intermedium, or often uses rotary members, such as rollers, for bending the wire, whereby it is not possible to avoid wear in each component which causes the deterioration thereof. Especially, there is a high probability of deterioration of the wire and breaking thereof. On the other hand, the rotary type servomotor is composed mainly of a DC motor with brushes, whereby its lifetime should be considered to have a fixed limit. Also, wear of resistors in the potentiometer has been one of the factors lowering the reliability.

The third limit concerns a problem of noises. The aforesaid conventional methods transmit a rotating force of the rotary type motor to the controlled object through various transmitting members to thereby linearly drive the object, resulting in generation of considerably larger noises at each component, especially resonant noises in the wire and rotation noises in the roller. Hence, the machinery is often significantly degraded.

Several proposals have been made to eliminate the aforesaid defects. For example, application of a linear stepping motor has been proposed, which is intended to directly drive the pen block and the like so that the aforesaid defect can be eliminated considerably in part, but it is difficult to complete the closed loop control because of the use of stepping motor, resulting in difficulties which remain at high-speed operation and high acceleration. Also, the linear stepping motor is suitable for the automatic drafting machine, such as XY plotter, but not suitable for an analog recorder, thereby being defective in the limited application range.

SUMMARY OF THE INVENTION

A brushless linear servomotor of the invention can solve all the aforesaid conventional problems, and its many characteristics will be described as follows:

(1) It is a DC linear servomotor for directly linear-driving the controlled object e.g. the pen block or the like.

(2) It is a brushless DC linear motor which houses therein a non-contact system position detecting sensor which constitutes an electronic commutator.

(3) It has an electronic linear potentiometer (electronic scale means) and there is no need of providing an independent potentiometer.

(4) The aforesaid internal electronic scale means comprises an scale encoder, sensor and electronic circuit of an incremental mode.

(5) The sensor of the internal electronic scale means is used in common with the non-contact system position sensor in the electronic commutator, and is exclusive of all contacts, such as brushes.

(6) The scale encoder of the incremental mode in the internal electronic scale means comprises a scale (a measure) having indents of regular pitches, which is used in common with a stator of the motor itself.

(7) The stator of the component of the motor magnetic circuit has a large number of tooth-like salients and slots comprising magnetic materials disposed lengthwise of the stator at regular pitches so that the sensor used for both the motor electronic commutator and the electronic scale means, detects the salients and slots.

(8) This linear servomotor is of the so-called magnetic teeth construction so that a movable element has the tooth-like salients and slots of the same magnetic materials as in the stator.

(9) The linear servomotor includes a XY recorder, analog recording meter, and a line printer as well as the XY plotter and is applicable widely regardless of digital or analog control.

(10) The motor in contactless, as noted above, thereby being extremely high in its reliability.

(11) Since the controlled object is directly linear-controlled as noted above, the motor has a high accuracy. Also, the motor, having no force-transmitting member, has a long lifetime and reduces noises.

(12) The components are designed to be used in common with each other and be integral with each other whereby the motor is inexpensive to produce and can be smallsized and lightweight.

BRIEF DESCRIPTION OF THE DRAWINGS

Next, the present invention will be detailed in accordance with the accompanying drawings, in which:

FIGS. 1(a)-(d) show a principal portion of an embodiment of a brushless linear servomotor of the present invention, in which

FIGS. 8(a)-(d) show a schematic structure of still another example of a brushless linear servomotor according to this invention, in which

FIGS. 9(a)-(d) show a schematic structure of another example of the mechanism of the brushless linear servomotor of this invention, in which

DESCRIPTION OF THE PREFERRED EMBODIMENTS

Figure 1A:
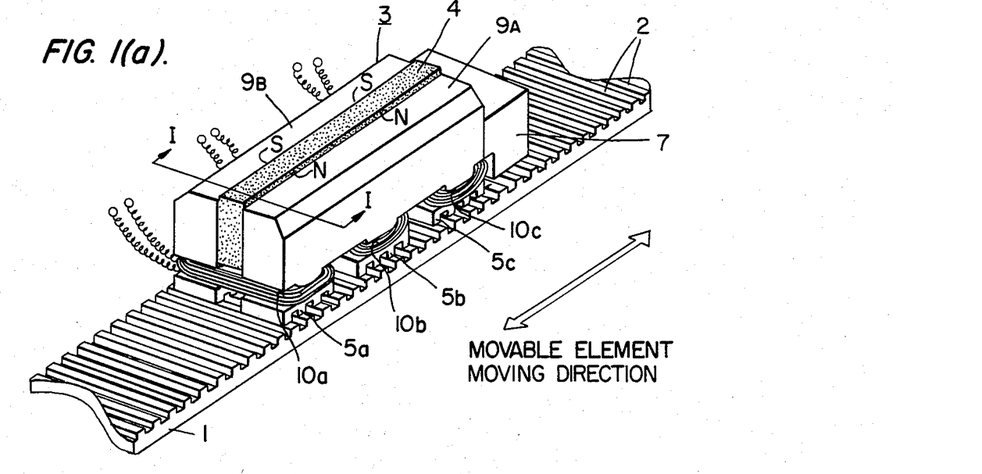
FIG. 1(a) is a perspective view of the embodiment.
Figure 1B:
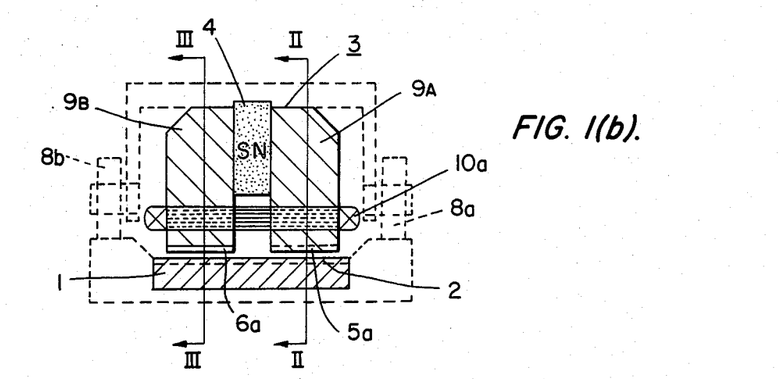
FIG. 1(b) is a cross-sectional view thereof, and FIGS. 1(c) and (d) are longitudinally sectional views of the embodiment.
Figure 1C:
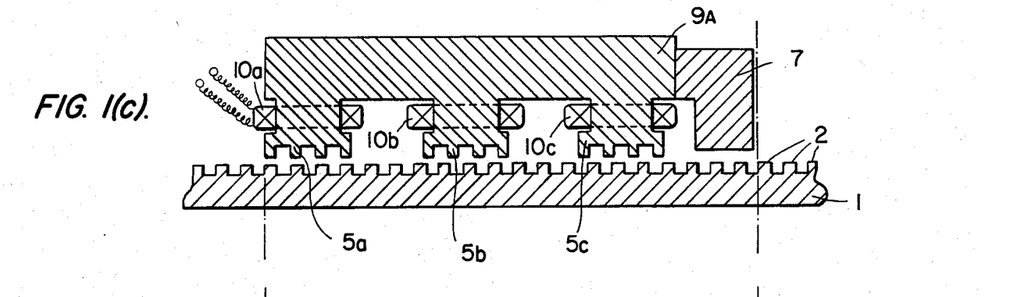
Figure 1D:
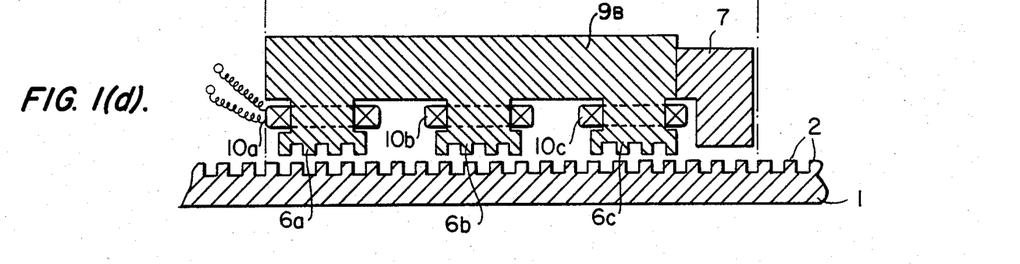

FIGS. 1(a)-(d) show an embodiment; of a mechanism of a brushless linear servomotor of the invention, in which FIG. 1(a) is a perspective view of a principal portion of the embodiment, FIG. 1(b) is a sectional view perpendicular to the moving direction of a movable element (a sectional view taken on the line I—I in FIG. 1(a)), and FIGS. 1(c) and (d) are sectional views parallel to the moving direction of the movable element (sectional views taken on the lines II—II and III—III in FIG. 1(b)). The components in common in FIGS. 1(a) through (d) are designated by the same reference numerals. In the drawings, reference numeral 1 designates a first member or stator. The stator 1 has a large number of tooth-like salients and slots 2 comprising magnetic materials (to be hereinafter called magnetic teeth) arranged lengthwise of the stator (in the moving direction of a second member or movable element) at regular pitches. Element 3 designates a second member or movable element, which comprises a permanent magnet 4 magnetized in the direction of the plane perpendicular to the moving direction of the movable element 3, two magnetic cores 9A and 9B in layers and sandwiching the permanent magnet 4, three three-phase coils 10a, 10b, and 10c, three groups of magnetic teeth 5a, 5b, and 5c indented on the surface of magnetic core 9A opposite to the stator 1, three groups of magnetic teeth 6a, 6b, and 6c indented similarly on the surface of magnetic core 9B, a non-contact position detecting sensor block 7, and guide means 8a and 8b, such as rollers, keeping constant a minute gap between the stator 1 and the movable element 3 and smoothly guiding the movable element 3, where the guide means are shown by the broken line only in FIG. 1(b) for a simplification of the drawing.

In this embodiment, the stator 1 is provided with a large number of magnetic teeth 2 indented and disposed lengthwise of the stator 1 at regular pitches, while, the movable element 3 has six groups of magnetic teeth of each three group indented at the magnetic cores 9A and 9B, the magnetic teeth in the same group being the same in pitch as the those in the stator 1, but out of phase between all the different groups. Among FIGS. 1(c) and (d) of sectional views of the different planes parallel to and lengthwise of the stator 1 as aforegoing, FIG. 1(c) includes the magnetic core 9A in section and FIG. 1(d) the core 9B in section. As seen from FIGS. 1(c) and (d), the groups of magnetic teeth 5a, 5b and 5c are out of phase by 120° from each other and those 6a, 6b and 6c at the magnetic core 9B are similar to the above. The magnetic cores 9A and 9B are out of phase therebetween by 180° from each other. In other words, the magnetic teeth groups 5a and 6a, 5b and 6b, and 5c and 6c have a phase difference of 180° respectively. Coils 10a, 10b and 10c, all are wound across the magnetic cores 9A and 9B. The three three-phase coils, when energized sequentially by a current, can move the movable element 3 above and lengthwise of the stator 1. Especially, when the coils are energized electronically in the order according to the position information from the non-contact position detecting sensor block 7, the movable element 3 is movable smoothly and continuously.

Here, explanation will be given on the magnetic circuit and the principle of generation of a drive force in the embodiment of the mechanism of the brushless servomotor of the invention shown in FIGS. 1(a)-(d).

Figures 2, 3:
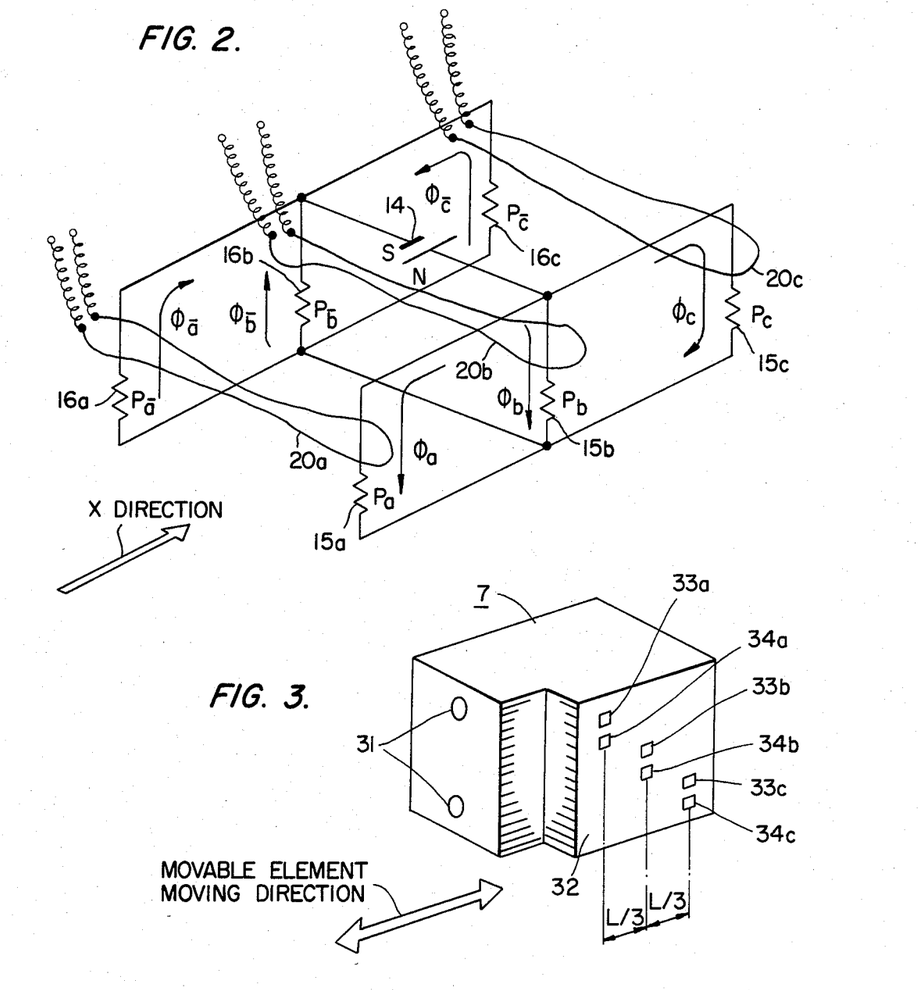
FIG. 2 is a schematic view explanatory of the magnetic circuit in FIGS. 1(a)-(d).
FIG. 3 is a perspective view of a non-contact position detecting sensor block.

Referring to FIG. 2, the magnetic circuit, for explanation thereof, is displaced by a model in the electric circuitry mode, in which reference numeral 14 designates a cell represented in place of the permanent magnent and permeances 15a, 15b, 15c, 16a, 16b, and 16c represent permeances of the gaps between the magnetic groups 5a, 5b, 5c, 6a, 6b and 6c at the movable element 3 and the magnetic teeth 2 at the stator 1, respectively, where magnetic resistances of magnetic cores 9A, 9B and stator 1 are assumed to be equal to zero. Reference numerals 20a, 20b and 20c designate three three-phase coils in a model fashion. Assuming that the permeances of the gaps between the stator's teeth and the movable element's magnetic teeth groups vary in the sine wave mode regarding the moving direction of the movable element 3, and representing the moving displacement of movable element 3 by X, pitch of magnetic teeth by L, and the average value of the respective permeances by Po, magnitudes Pa, Pb, Pc, P̄a, P̄b and P̄c of the respective permeances 15a, 15b, 15c, 16a, 16b and 16c are obtainable of the approximate values as shown in the following equations:

$$P_a = P_o + p \sin \frac{2\pi}{L} X$$

-continued $$P_b = P_o + p \sin \left( \frac{2\pi}{L} X - \frac{2}{3} \pi \right)$$

$$P_c = P_o + p \sin \left( \frac{2\pi}{L} X - \frac{4}{3} \pi \right)$$

$$P_{\bar{a}} = P_o - p \sin \frac{2\pi}{L} X$$

$$P_{\bar{b}} = P_o - p \sin \left( \frac{2\pi}{L} X - \frac{2}{3} \pi \right)$$

$$P_{\bar{c}} = P_o - p \sin \left( \frac{2\pi}{L} X - \frac{4}{3} \pi \right) ,$$

where p is a half-width value of variation of permeance. Here, $P_a+P_b+P_c=3P_o$ and $P_{\bar{a}}+P_{\bar{b}}+P_{\bar{c}}=3P_o$, are obtained, so the total permeances in the magnetic circuit when viewed from the magnet may be assumed constant $$\left( \frac{3}{2} P_o \right)$$

regardless of a value of X, and also a magnetic potential difference between both ends of each permeance may be assumed constant regardless of the value of X. Now, when the magneto-motive force of the magnet is represented by F, the magnetic potential difference at both ends of each permeance becomes F/2. Hence, the magnetic flux $\phi_a$, $\phi_b$, $\phi_c$, $\phi_{\bar{a}}$, $\phi_{\bar{b}}$ or $\phi_{\bar{c}}$ passing through each permeance $P_a$, $P_b$, $P_c$, $P_{\bar{a}}$, $P_{\bar{b}}$, or $P_{\bar{c}}$ can be approximated by each of the following equations:

$$\phi_a = \frac{F}{2} \cdot P_a = \frac{F}{2} \left\{ P_o + p \sin \frac{2\pi}{L} X \right\}$$

$$\phi_b = \frac{F}{2} \cdot P_b = \frac{F}{2} \left\{ P_o + p \sin \left( \frac{2\pi}{L} X - \frac{2}{3} \pi \right) \right\}$$

$$\phi_c = \frac{F}{2} \cdot P_c = \frac{F}{2} \left\{ P_o + p \sin \left( \frac{2\pi}{L} X - \frac{4}{3} \pi \right) \right\}$$

$$\phi_{\bar{a}} = \frac{F}{2} \cdot P_{\bar{a}} = \frac{F}{2} \left\{ P_o - p \sin \frac{2\pi}{L} X \right\}$$

$$\phi_{\bar{b}} = \frac{F}{2} \cdot P_{\bar{b}} = \frac{F}{2} \left\{ P_o - p \sin \left( \frac{2\pi}{L} X - \frac{2}{3} \pi \right) \right\}$$

$$\phi_{\bar{c}} = \frac{F}{2} \cdot P_{\bar{c}} = \frac{F}{2} \left\{ P_o - p \sin \left( \frac{2\pi}{L} X - \frac{4}{3} \pi \right) \right\}$$

The flux interlinking three three-phase coils 20a, 20b and 20c comprises $\phi_a$ and $\phi_{\bar{a}}$, $\phi_b$ and $\phi_{\bar{b}}$, and $\phi_c$ and $\phi_{\bar{c}}$. Since $\phi_a$ is reverse in its direction with respect to $\phi_{\bar{a}}$, a sum of the flux $\Phi_A$ interlinking the coil 20a is expressed as follows:

$$\Phi_A = \phi_a - \phi_{\bar{a}} = F \cdot p \sin (2\pi/L) X.$$

Similarly, the sum of flux $\Phi_B$ and that of $\Phi_C$ are represented as follows:

$$\Phi_B = \phi_b - \phi_{\bar{b}} = F \cdot p \sin \left( \frac{2\pi}{L} X - \frac{2}{3} \pi \right)$$

$$\Phi_C = \phi_c - \phi_{\bar{c}} = F \cdot p \sin \left( \frac{2\pi}{L} X - \frac{4}{3} \pi \right)$$

As seen from the above equations, $\Phi_A$, $\Phi_B$ and $\Phi_C$ are functions of X, which have cycle periods of pitch L of the stator's magnetic teeth, and are sine waves phase-shifted by 120° from each other. Accordingly, a three-phase position detector (sensor) capable of detecting the pitch or salients and slots of the stator's magnetic teeth is provided to energize the coils 20a, 20b and 20c one by one on a basis of an output of the sensor, so that the driving force can be generated always in one direction.

The aforesaid sensor is included in the non-contact position detecting sensor block 7 in the embodiment of the invention in FIGS. 1(a)-(d), which is constructed so as to detect the salients and slots condition of the stator's magnetic teeth directly and without contacting (by non-contact), so that the coils are energized electronically in the order on a basis of an output of the sensor, thereby completing an electronic commutator motor having no brushes and contacts. The motor of the invention shown in FIGS. 1(a)-(d) has three three-phase coils so that threee sensors are included in the non-contact position detecting sensor block 7 and are positioned 120° out of phase with respect to the pitch L of the splines at the stator's magnetic teeth in order to directly detect the salients and slots.

FIG. 3 shows an embodiment of a non-contact position detecting sensor block of the brushless linear servomotor of the invention, the sensor block being represented in a condition of being laid on the side to keep the surface opposite to the stator, at this side of the drawing. In FIG. 3, reference numeral 7 designates a non-contact position detection sensor block, 31 designates threaded bores through which the sensor block 7 is connected to the movable element 3; 32 designates the surface of sensor block 7 opposite to the stator 1; 33a and 34a designate a pair of elements consisting of a light-emitting element and a light-receiving element mounted on the surface 32, the light-emitting element 33a emitting light which is approximately perpendicularly with respect to the surface 32, the light-receiving element 34a receiving the light which is projected from the light-emitting element 33a to the stator and reflected therefrom; 33b and 34b, and 33c and 34c, designate similar pairs of elements consisting of a light-emitting element and a light-receiving element.

Accordingly, three pairs of light-emitting and light-receiving elements are provided, thereby enabling the salients and slots of magnetic teeth at the stator 1 to be detected as a change in the intensity of the reflected light. The relationship of the relative position between the three pairs of light-emitting and light-receiving elements should be determined in connection with the pitch L of magnetic teeth at the opposite stator. In the case of the FIG. 3 embodiment, each pair of light-emitting and light-receiving elements are mounted at intervals of L/3 in the moving direction of the movable element 3, the interval being so determined that three light-receiving elements output signals whose waveform is phase shifted by 120° in connection with their respective positions.

These three pairs of light-emitting and light-receiving elements are required to serve as the electronic commutators for the three coils of the movable element 3, so that the relative position relationship between the elements and the magnetic teeth groups at the movable element 3 is important, whereby the light-emitting and light-receiving elements should of course be mounted at the predetermined distance respectively.

Figure 4:
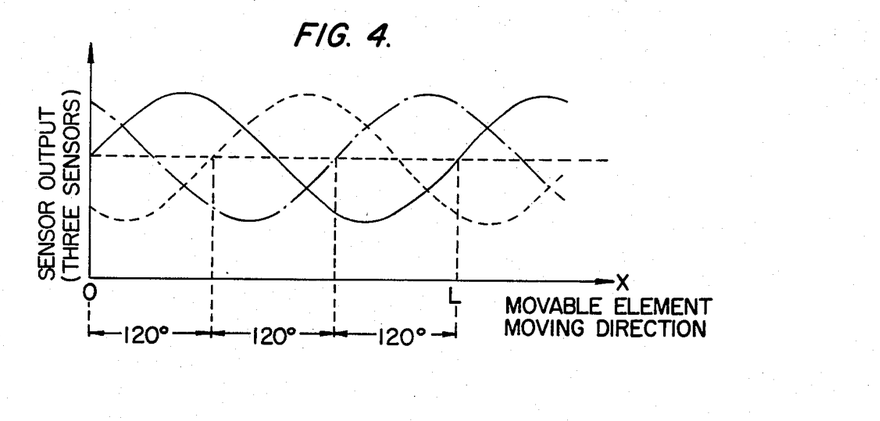
FIG. 4 shows the waveform of the output of the non-contact position detecting sensor.

FIG. 4 shows a waveform exemplary of a sensor output waveform of the non-contact position detecting sensor block 7. The outputs of three three-phase sensors (light-receiving elements) have waveforms phase-shifted by 120° from each other. In addition, each waveform should approximate a sine wave as much as possible for the reason to be discussed below.

The non-contact position detecting sensor applicable to this invention is not inevitably limited to the aforesaid light-emitting and light-receiving elements. For example, Hall elements (not shown) may be used, where it is necessary for the position sensor to detect the salients and slots at the stator magnetic teeth directly and without contacting and have an output which is a low distortion sine wave.

It is one of the structural necessities of the invention that the aforesaid brushless linear servomotor is provided with the stator and movable element which have a large number of teeth-like splines. Another necessity for the motor is that the stator mainly comprises the magnetic teeth of magnetic material. Such a construction is found in a stepping motor and such a construction is important and indispensable to the linear servomotor of the invention for the following reasons in brief.

(a) The motor of the present invention is a linear servomotor completely free from contacts, and houses in the motor its electronic scale means, and the non-contact position detecting sensor used in common with the electronic commutator performs the position detection assuming the stator to be the scale (measure) of the linear encoder. In order to improve the resolving-power of the electronic scale means, it is favorable for the interpolation to miniaturize the scale pitch as much as possible, so that the construction of magnetic teeth having fine pitches is suitable for the motor.

(b) An optical grid or the like of fine indents, instead of such stator, is used as the scale, which can meet the above requirement, but will depart entirely from the purposes of the invention, one of which is to obtain the effect of using the components in common and integral with them to thereby lower the manufacturing cost and miniaturize the motor of the invention.

(c) Furthermore, a permament magnet magnetized in fine pitch, instead of the stator having minute magnetic teeth, is used as the stator, which can exist in principle (in this case, the permanent magnet usually need not be provided at the movable element side). In fact, it is impossible to obtain the intense magnetic field even by fine magnetization, resulting in that only an extremely small driving force is obtained, while, when strip-like permanent magnets previously magnetized are disposed lengthwise alternately at N and S poles and used as the stator, the driving force may somewhat be improved, but it is not realistic from the viewpoint of the accuracy and manufacturing cost to form the stator of several tens of centimeters to one meter in length.

(d) The linear servomotor of the invention, as above-mentioned, is applicable to the biaxial apparatus, such as a XY plotter or a XY recorder. In a case of using a general flat-bed type apparatus, a Y-axis motor, including its stator, serves as a movable element for a X-axis motor, whereby the stator is required to be lightweight. From this viewpoint, the stator of the FIGS. 1(a)-(d) embodiment merely comprising magnetic teeth without using any permanent magnet is very advantageous with respect to its accuracy and manufacturing cost and is small size and light-weight.

Also, the aforesaid embodiment of the mechanism of the brushless linear servomotor of the invention adopts the so-called three-phase motor (therefore, the number of coils is 3). Generally, a two-phase motor is rather simple in construction and can reduce, for example, the number of sensor elements at the non-contact position sensor and of the coils, and can be simplified along with the electric circuit. The motor in the FIGS. 1(a)-(d) embodiment, however, is provided at the movable element with a magnetic circuit including the permanent magnet, so that, when the number of phases is small, unevenness of the magnetic force (the so-called cogging force) particular to the magnetic circuit remains, which is liable to cause noises or a servo error for positioning. Therefore, the embodiment of the invention adopts the three-phase motor. When the motors equal in the size and thrust are actually compared, it has been ensured that the remaining cogging force of three-phase motor becomes 1/5 to 178 of that of the two-phase motor. However, the present invention is not limited to the embodiment of the three-phase motor, but may be formed of polyphases corresponding to its use. In addition, the motor in the FIGS. 1(a)-(d) embodiment provides the movable element including the permanent magnet, which is not inevitably necessary for the invention. A construction of the movable element including no permanent magnet is also applicable to the present invention.

Such a motor, which includes no permanent magnet; needs a larger energization, but generates no cogging force, thereby being advantageous generating less noise or having a higher accuracy for positioning.

Figure 9A:
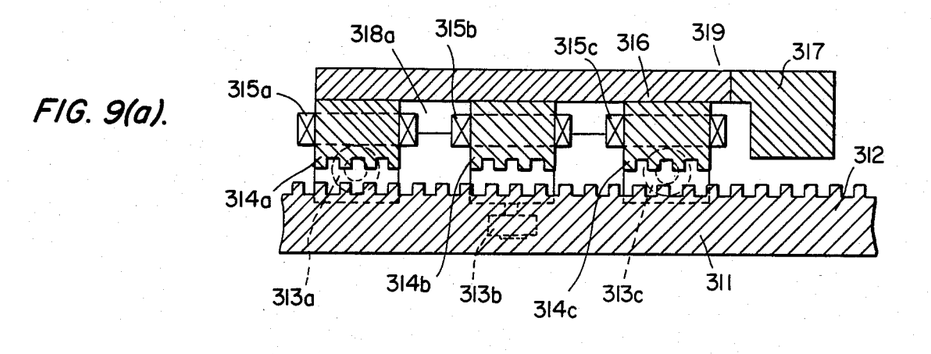
FIG. 9(a) is a sectional view taken on the line IV—IV in FIG. 9(b)
Figure 9B:
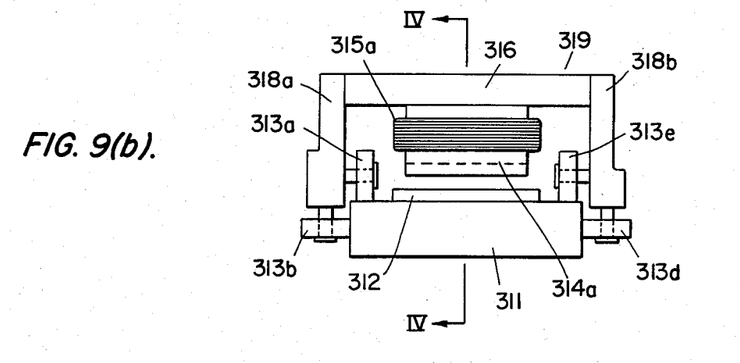
FIG. 9(b) is a front view.
Figure 9C:
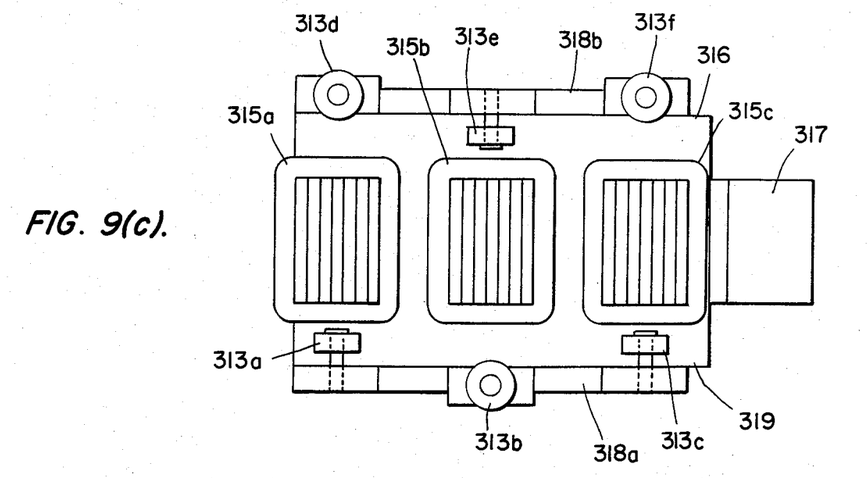
FIG. 9(c) is a back view of a movable element.

FIGS. 9(a)-(c) show a schematic structure of another example of the mechanism of the brushless linear servomotor of this invention. FIG. 9(a) is a sectional view taken on the line IV—IV in FIG. 9(b). FIG. 9(b) is a front view. FIG. 9(c) is a back view of a movable element.

Referring FIGS. 9(a)-(c), a movable element 319 comprises: three field cores 314a, 314b, 314c comprising magnetic materials; a base yoke 316 for fixing these field cores; coils 315a, 315b, 315c for energizing respective field cores; guide means 313a, 313b, 313c, 313d, 313e, 313f such as bearings for making it possible for the field cores to move along a stator with a minute gap being kept between the field cores and the stator; side plates 318a, 318b for supporting the guide means such as the bearing; and a non-contact position detecting sensor block comprising plural sensor elements for detecting positions by non-contact means. Besides, end portions of respective field cores 314a, 314b, 314c have plural magnetic teeth of a pitch L. The phases of the magnetic teeth of these field cores are shifted from each other by 120° toward the movable element movement direction as shown in FIG. 9(a). Furthermore, the stator 311 comprises a magnetic material and has, at a surface thereof facing the magnetic teeth provided on said movable element 319, magnetic teeth having a pitch L which is the same as that of the magnetic teeth of the movable element 319.

According to this example, the movable element and the stator face each other at one plane. However, it is not necessary that this invention be limited to such one-plane facing. Rather, multi-plane facing can be employed instead.

According to such a linear servomotor, the movable element 319 can move along the stator 311 by providing 3-phase non-contact position detecting sensor which can detect the magnetic teeth pitch or the salients and slots of the magnetic teeth of the stator, and by sequentially switchingly energizing the three three-phase coils wound around the movable element in response to the output of the sensor elements.

The above sensor elements are included in the non-contact position detecting sensor block 317 according to this invention. The sensor elements are so constructed so as to directly detect the salients and slots of the magnetic teeth of the stator by non-contact. By electronically energizing the coils sequentially switchingly in response to the outputs of the sensor elements, an electronic commutator motor having no brushes or contacts can be formed. In FIGS. 9(a)–(c), the motor is of three-phase coils, so that number of the sensor elements included in the non-contact position detecting sensor block 317 is also three. In order to directly detect the salients and slots of the stator magnetic teeth, the positions of the sensor elements are shifted from each other by 120° with respect to the pitch L.

Figure 8A:
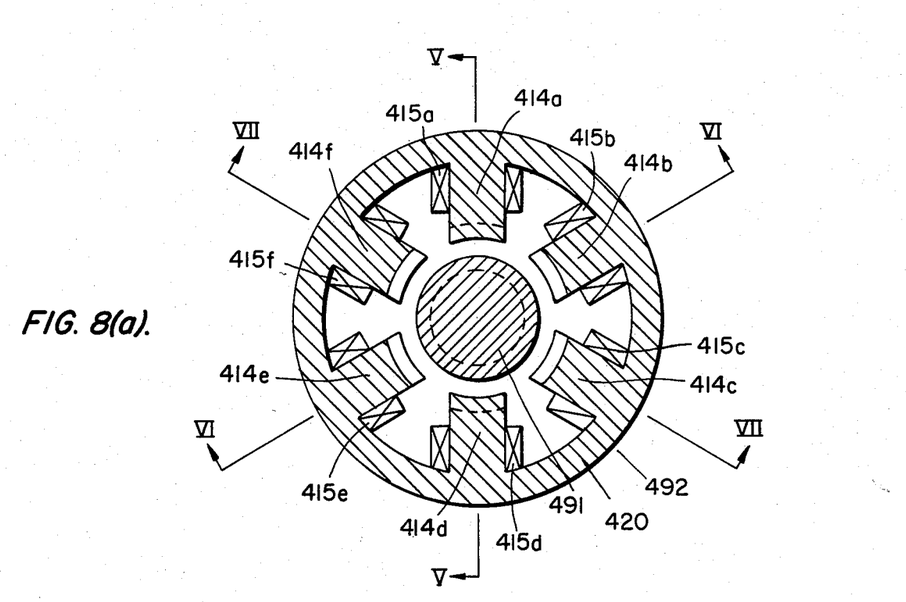
FIG. 8(a) is a sectional view of a movable element and a stator taken on a plane perpendicular to the direction in which the movable element moves relative to the stator.
Figure 8B:
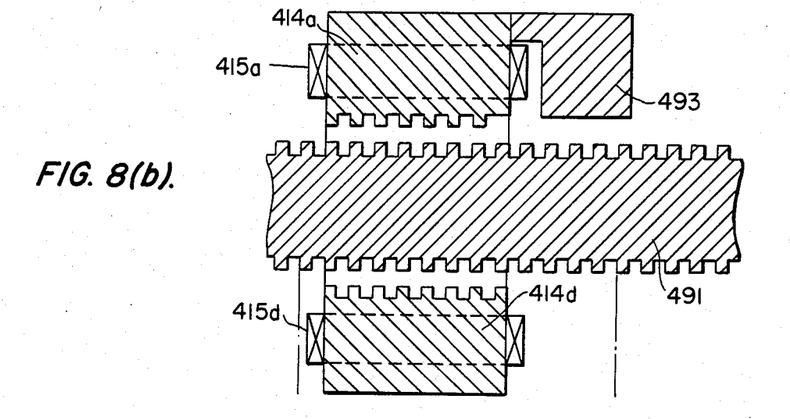
FIG. 8(b) is a sectional view taken on the line V—V in FIG. 8(a)
Figure 8C:
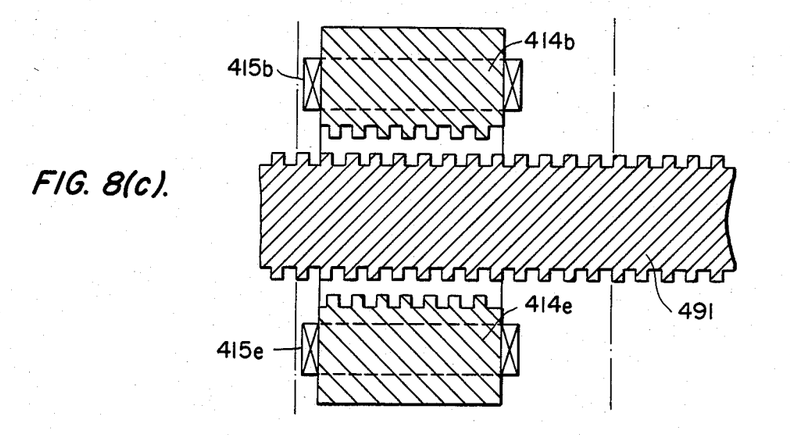
FIG. 8(c) is a sectional view taken on the line VI—VI in FIG. 8(a)
Figure 8D:
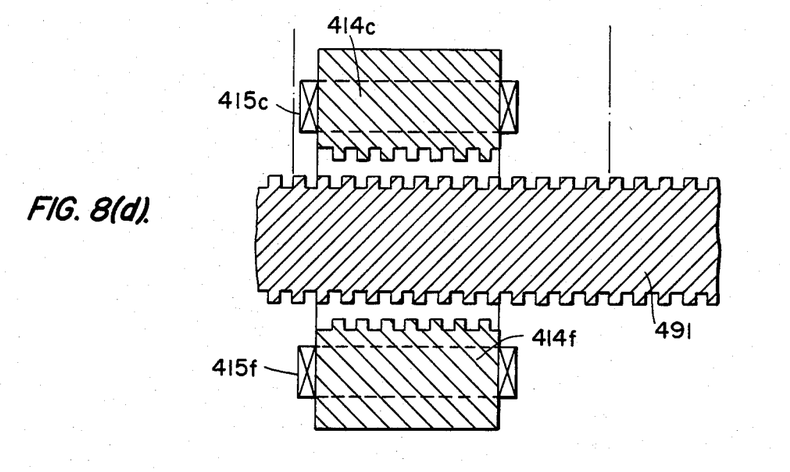
FIG. 8(d) is a sectional view taken on the line VII—VII in FIG. 8(a).

FIGS. 8(a)–(d) show a schematic structure of still another example of a brushless linear servomotor according to this invention. FIG. 8(a) is a sectional view of a movable element and a stator taken on a plane perpendicular to the direction in which the movable element moves relative to the stator. FIG. 8(b) is a sectional view taken on the line V—V in FIG. 8(a). FIG. 8(c) is a sectional view taken on the line VI—VI in FIG. 8(a). FIG. 8(d) is a sectional view taken on the line VII—VII in FIG. 8(a). FIGS. 8(b), (c) and (d) are drawn with the same phase (phase of the magnetic teeth) with respect to the relative movement direction.

Referring to FIGS. 8(a), (b), (c) and (d), a movable element 492 comprises: six field cores 414a, 414b, 414c, 414d, 414e, 414f made of magnetic materials; a ring shape base yoke 420; six coils 415a, 415b, 415c, 415d, 415e, 415f for energizing the above field cores; and a non-contact position detecting sensor block 493 containing three sensor elements for detecting the positions by non-contact means. The end portions of the respective field cores facing the stator 491 have plural magnetic teeth of a pitch L. The stator 491 comprises a cylindrical magnetic material and has magnetic teeth of the same pitch L as that of the magnetic teeth of the movable element 492 arranged in the length direction thereof on the external surface thereof. The magnetic teeth of the stator 491 are formed on a cylindrical plane. The magnetic teeth of the movable element 492 and the magnetic teeth of the stator 491 face each other with a minute gap therebetween caused by a guide means provided in the movable element and/or the stator, although such is not shown. Furthermore, the magnetic teeth of respective field cores are made to have the same phase with respect to partial relationships 414a–414d, 414b–414e, 414c–414f, while they are made to have 120° phase shift with respect to the other relationships 414a–414b, 414b–414c, 414c–414d.

According to such a linear servomotor, the movable element can move by: setting three sensor elements in the non-contact position detecting sensor block 493; directly detecting the salients and slots of the stator magnetic teeth by non-contact means so as to output three-phase sine wave signals; and sequentially switchingly energizing three-phase six coils in response to such output signals. Besides, each pair of coils 415a–415d, 415b–415e, 415c–415f is series-connected or parallel-connected to each other so as to be simultaneously energized. The plane on which the magnetic teeth of the stator are formed is a cylinder. This cylinder can be a perfect cylinder or a partially broken cylinder.

Next, explanation will be given on an electric circuit unit of the brushless linear servomotor of the present invention.

Figure 5:
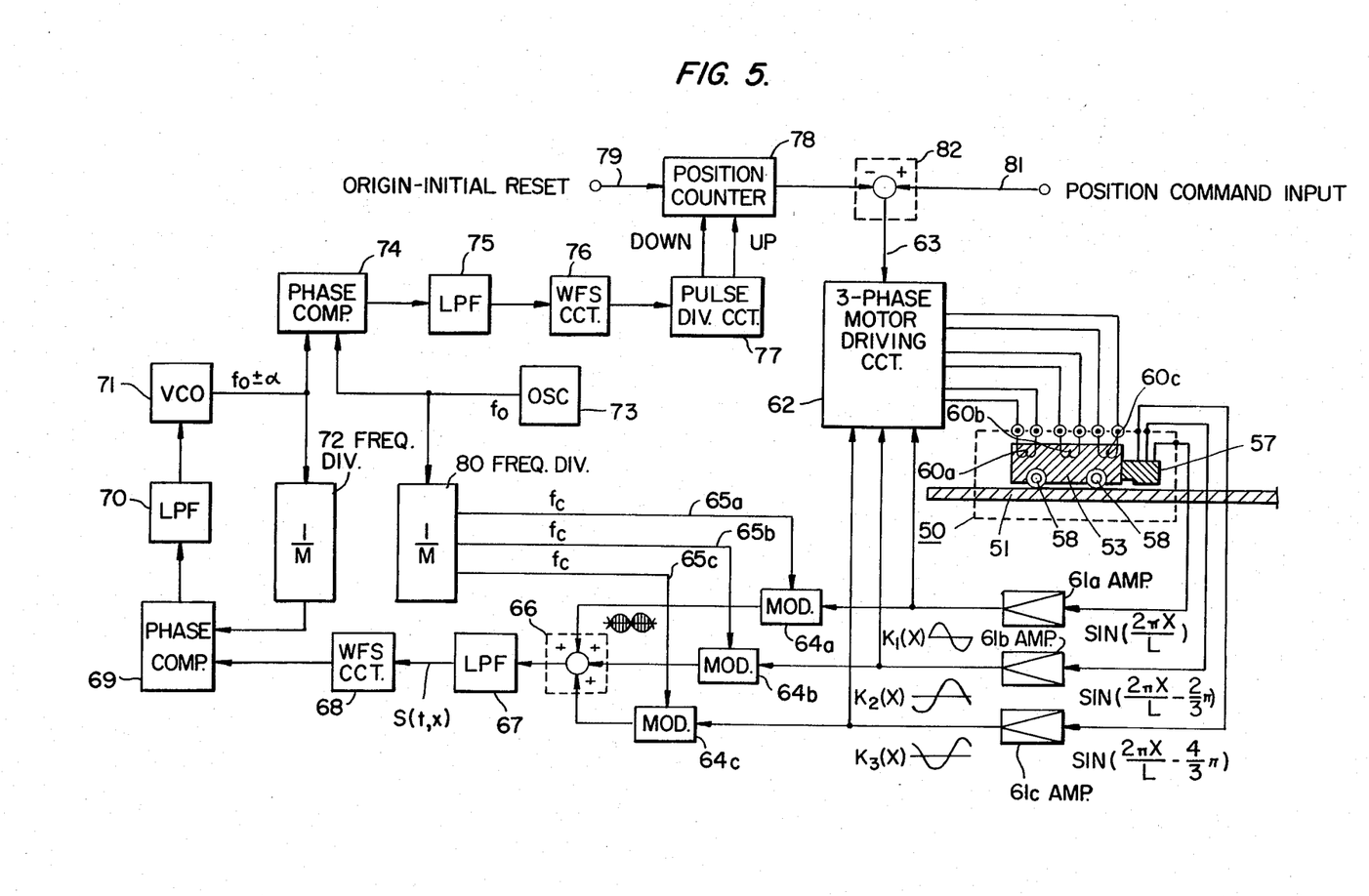
FIG. 5 is a block diagram of the electric circuitry of the embodiment of the present invention.

FIG. 5 is a block diagram of the electric circuit unit of the brushless linear servomotor of the aforesaid embodiment, in which reference numeral 51 designates a stator, 53 designates a movable element, 57 designates a non-contact position detecting sensor block, 58 designates roller bearings, 60a, 60b and 60c designate three three-phase coils respectively, and 61a, 61b and 61c designate position signal amplifiers for amplifying the three-phase position signals from the non-contact position detecting sensor block 57 respectively, the position signal amplifiers each generating sine wave outputs of the cycle period of the pitch of magnetic teeth at the stator 1 and phase-shifted by 120° (by L/3) from each other, the sine wave outputs being the position signal for the electronic commutator. Reference numeral 62 designates a three-phase motor driving circuit, which energizes the three-phase motor coils in the order corresponding to the position signals output from the position signal amplifiers 61a, 61b and 61c, the intensity of its current is proportional to a motor command voltage input 63, and the non-contact electronic commutator comprises the aforesaid sensor and an electronic circuit.

The position signal outputs of the position signal amplifiers 61a, 61b and 61c are used for the electronic scale means as well as for the above electronic commutator. The residual portion in the FIG. 5 block diagram relates mainly to the electronic scale means, which is electronic but not mechanical. Next, explanation will be given on the electronic scale means. Reference numerals 64a, 64b and 64c designate modulators respectively. The modulators 64a, 64b and 64c each are a kind of multiplier and modulate carrier wave signals 65a, 65b and 65c of high frequency by use of three sine wave outputs from the position signal amplifiers 61a, 61b and 61c respectively, where the three carrier wave signals are phase-shifted by 120° respectively. Reference numeral 66 designates an adding circuit for adding the modulated outputs from the modulators 64a, 64b and 64c, 67 designates a low-pass filter to eliminate the harmonic component in the modulated outputs added by the adding circuit 66 so as to extract the fundamental wave component only, and 68 designates a waveform shaping circuit for shaping the fundamental wave into a rectagular waveform.

Now, three sine wave outputs of position signal amplifiers 61a, 61b and 61c are represented by $K_1(X)$, $K_2(X)$ and $K_3(X)$, and assumed representable by the following equations respectively:

$$K_1(X) = k \sin \frac{2\pi X}{L}$$

-continued $$K_2(X) = k \sin\left(\frac{2\pi X}{L} - \frac{2}{3}\pi\right)$$

$$K_3(X) = k \sin\left(\frac{2\pi X}{L} - \frac{4}{3}\pi\right)$$

where X is an amount of displacement of the movable element, L is the pitch of magnetic teeth at the stator, and k is a half-width of amplitude.

On the Other hand, the carrier wave signals 65a, 65b and 65c are represented by $C_1(t)$, $C_2(t)$, and $C_3(t)$ and assumed representable as the following equations respectively.

$$C_1(t) = \sin(2\pi f_c t)$$

$$C_2(t) = \sin\left(2\pi f_c t - \frac{2}{3}\pi\right)$$

$$C_3(t) = \sin\left(2\pi f_c t - \frac{4}{3}\pi\right)$$

where $f_c$ is the carrier wave frequency.

If the result of addition by the adding circuit 66 after modulation by the modulators 64a, 64b and 64c, is represented by S(t, X), the following equation is obtained:

$$S(t,X) = K_1(X) \cdot C_1(t) + K_2(X) \cdot C_2(t) + K_3(X) \cdot C_3(t)$$

$$k\left\{\sin\left(\frac{2\pi X}{L}\right) \cdot \sin(2\pi f_c t) + \sin\left(\frac{2\pi X}{L} - \frac{2}{3}\pi\right) \cdot \right.$$

$$\sin\left(2\pi f_c t - \frac{2}{3}\pi\right) + \sin\left(\frac{2\pi X}{L} - \frac{4}{3}\pi\right) \cdot$$

$$\left. \sin\left(2\pi f_c t - \frac{4}{3}\pi\right)\right\}$$

$$= \frac{3}{2} k \cos\left(2\pi f_c t - \frac{2\pi}{L} X\right)$$

This means the carrier wave with the frequency $f_c$ includes a phase term of $(2\pi X/L)$. In other words in S(t,X), the position information X is transformed into the phase information of S(T,X) when demodulated, can detect the position of movable element 53 in the motor. Also, when the movable element 53 moves at the speed V, from X=Vt, the function S(t,V) of speed at the variable is expressed by $$S(t,V) = \frac{3}{2} k \cos\left(2\pi f_c t - \frac{2\pi}{L} Vt\right)$$

$$= \frac{3}{2} k \cos\left\{2\pi\left(f_c - \frac{V}{L}\right) t\right\}$$

This means the speed information V is represented as the displacement from the carrier frequency $f_c$. Now, assuming $f_c = 10$ KHz and L=1 mm, in a case of the speed V=±1 m/s, V/L=±1 KHz is obtained whereby the frequency of S(t,V) becomes $f_c \mp 1$ KHz, i.e., 9 KHz and 11 KHz.

In addition, a condition of detecting the correct position of the movable element 3 from the above result S(t,X) is that the waveform of position signals $K_1(X)$, $K_2(X)$ and $K_3(X)$ are like sine waves of less distortion in connection with the position X. The distortion, if larger, will lead to the electronic scale means larger in swell and poor in linearity.

The low-pass filter 67, which serves to eliminate the harmonic component included in the signal S(t,X), is indispensable because the carrier wave signals 65a, 65b and 65c having a large amount of harmonic content are often used.

The signal S(t,X) added after modulation cannot be utilized as it is. Hence, it is necessary to demodulate the signal and extract therefrom the position information only. The embodiment of the invention employs the demodulation method such that a PLL (Phase Locked Loop) circuit including a frequency divider is used to multiply the signal S(t,X) and compare it with the reference frequency to thereby extract the position information of a high resolving-power, the PLL circuit comprising a phase comparator 69, a low-pass filter 70 which filters the low region of the output of comparator 69, a VCO (voltage controlled oscillator) 71 controlled by the output of low-pass filter 70, and a frequency divider 72 which divides the frequency (represented by $f_v$) by 1/M (M is an integer). In addition, the phase comparator 69 is fed the signal S(t,X) shaped into the rectangular wave by the waveform shaping circuit 68 and the frequency-divided output of VCO 71 (the output of frequency divider 72). Such construction equalizes the output of the VCO to the signal S(t,X) multiplied by M to obtain M-times the frequency-phase information, and the following equation holds:

$$M\left(2\pi f_c t - \frac{2\pi}{L} X\right) = 2\pi \cdot M f_c t - 2\pi \frac{MX}{L}.$$

Here, a reference frequency generating circuit 73 generating the reference frequency like $f_o = M.f_c$ is provided and the reference frequency $f_c$ is compared with the multiplied output of VCO 71, thereby enabling the phase information $$\left(2\pi \frac{MX}{L}\right)$$

only to be separate, the comparison and separation being carried out by use of a phase comparator 74, a low-pass filter 75 and a waveform shaping circuit 76. The separate phase information $$\left(2\pi \frac{MX}{L}\right)$$

is cycle-periodic in relation to X and representable by $2\pi(MX/L) = 2n$ (n is the integer). The phase information shaped into the rectangular waveform phase by operation of the low-pass filter 75 and waveform shaping circuit 76, is as $X = n \cdot (L/M)$ so that an amount converted into displacement of movable element 53 becomes L/M per pulse. As seen from the above, the displacement of movable element 53 is detected stepwise and its minimum indent of L/M becomes the resolving-power, which means that the pitch L of magnetic teeth at the stator is interpolated by 1/M at regular intervals.

Therefore, in order to raise the resolving-power and obtain a smooth position information, L need only be smaller and M be larger. Reference numeral 77 designates a pulse dividing circuit, which divides the output pulse of the waveform shaping circuit 76 into up count pulses and down count pulses on the basis of the moving direction of movable element 53 because an output pulse of no polarity, even when counted directly by a position counter, cannot have its direction determined; 78 designates a position counter which counts the up count pulses and down count pulses in an incremental manner to display the present position of movable element 53 at a real time, and 79 designates an origin-initial reset input of the position counter 78.

In addition, reference numeral 80 designates a three-phase frequency-divider for dividing by 1/M the reference frequency $f_o$ from the reference frequency generating circuit 73 to thereby generate three-phase carrier wave signals 65a, 65b and 65c (of the frequency $f_c$) phase-shifted by 120° C. respectively.

The above construction allows the position counter 78 to digitally indicate the position of movable element 53. Hence, the output of position counter 78 becomes the output of the electronic scale means. The position control of movable element 53 is realized in such a manner that an error amplifying circuit 82 for amplifying a difference between the position command input 81 and the output of position counter 78, is used to give the output of error amplifying circuit 82 to the three-phase motor driving circuit 62 as the motor command voltage input 63.

Next, the electric circuitry of the invention will be further detailed of some parts.

Figure 6:
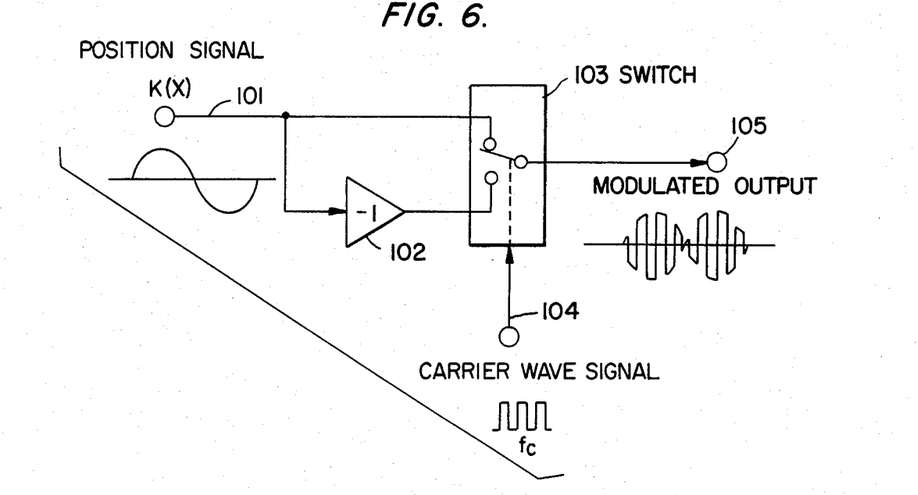
FIG. 6 is a circuit diagram of a modulator in the electric circuitry in FIG. 5.

FIG. 6 shows an embodiment of the FIG. 5 modulators 64a, 64b and 64c. Reference numeral 101 designates the sine wave output (position signal) K(X) of the position signal amplifier 61a, 61b or 61c; 102 designates an inverted amplifier (gain 1); 103 designates a semiconductor switch controlled by a carrier wave signal (frequency $f_c$) 104; and 105 designates a modulated output, the semiconductor switch 103 being adapted to transmit the position signal K(X) as it is when the carrier wave signal 104 is at the "High level" and the inverted position signal −K(X) when the carrier wave signal is at the "Low level", thereby obtaining the modulated output 105 as shown.

Figure 7:
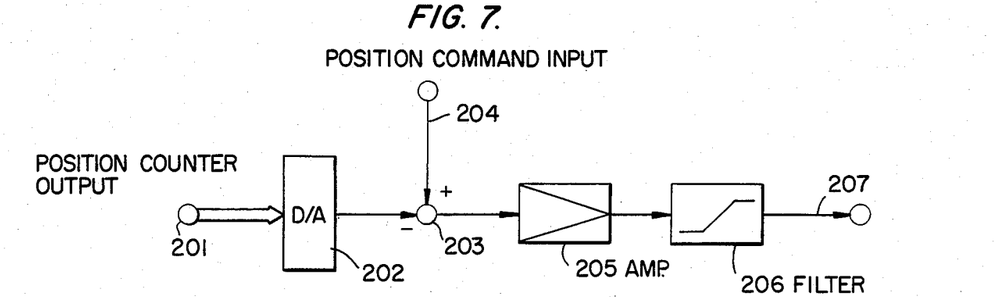
FIG. 7 is a circuit diagram of an error amplifier in the electric circuitry in FIG. 5.

FIG. 7 shows an embodiment of the error amplifier 82 in FIG. 5. In FIG. 7, reference numeral 201 designates an output of position counter 78; 202 designates a digital/analog converter for converting the output of position counter 78 into an analog value; 203 designates a subtractor used to obtain a difference between the position command input 204 (an analog input in this case) and the output (an analog signal indicating the present position of movable element 53) of the digital/analog converter 202; 205 designates an amplifier for amplifying the difference signal of subtractor 203; 206 designates a reed lug filter circuit for giving a moderate damping to the servo series for its stabilization, and 207 designates an output of the reed lug filter circuit 206, which serves as the motor command voltage input 63 given to the three-phase drive circuit 62.

As seen from the above, the brushless linear servomotor of the invention has several superior characteristics and advantages in the following points:

(1) The DC linear servomotor, which directly linear-drive the controlled object, can ensure the positional reliability and the reproducibility which have never been attained by the conventional example using the rotary-type motor and transmitting members. Also, noise can be reduced.

(2) The linear servomotor houses therein the non-contact position detecting sensor, by which the electronic commutator and electronically constructed scale means are composed to thereby eliminate any contact, and is higher in durability and reliability and is also free from the hysteresis and back-lash of the brush used in the conventional potentiometer.

(3) The electronic scale means housed in the motor has the sensor in common use with the sensor of the electronic commutator, and the scale (measure) of the encoder at the electronic scale means is the stator having teeth-like salients and slots (magnetic teeth) arranged lengthwise thereof, and uses the stator in command, whereby an independent linear potentiometer need not be provided, thereby making the motor advantageous with respect to its manufacturing cost and enabling it to be small-sized and lightweight.

(4) Since the stator is of simple construction such that a large number of magnetic teeth made of magnetic material are disposed lengthwise of the stator at regular intervals and other magnetic circuitry, such as a permanent magnet, is not included, the stator can be lightweight so that the motor is reducible in weight to be usable for the Y coordinate motor (cursor motor) in biaxial drafting equipment, such as a flat-bed-type XY plotter or XY recorder.

(5) In comparison with the conventional example, the number of parts of transmitting and movable members are very small, thus considerably reducing the amount of assembly work.

(6) The motor of magnetic teeth construction is the servomotor, but not the stepping motor, so as to be widely applicable not only for the plotter but also for an analog recorder including the XY recorder.

What is claimed is:

1. A brushless linear servomotor comprising:
   a first member provided at the surface thereof with magnetic teeth comprising a large number of teeth-like salients and slots arranged lengthwise of said first member at regular pitches, said magnetic teeth being formed on a flat plane of said surface;
   a second member movable along said first member and lengthwise thereof and relative thereto and having at least one magnetic cores, said second member comprising magnetic teeth groups engraved on said magnetic cores at the surfaces thereof opposite to said first member, a plurality of coils wound around said magnetic cores, and a guide means which keeps a constant gap between said magnetic cores and said first member to allow said second member to move smoothly relative to said first member;
   a plurality of non-contact detectors which are connected to said second member, and which detect said salients and slots of said magnetic teeth of said first member and convert the detected results into electric signals so as to thereby output position signals of sine wave form which are different from each other;

an electronic commutator means for energizing said plurality of coils in the order according to said position signals;

an electronic scale means which electronically measures the position of said second member relative to said first member by demodulating phase information from a carrier wave signal modulated by said position signals; and a motor driving circuit which extracts a difference between the output of said electric scale means and the input of position command and provides a current to said plurality of coils according to the magnitude of said difference so as to thereby allow said second member to move relative to said first member.

2. A brushless linear servomotor according to claim 1, wherein said electronic scale means comprises a reference frequency generating circuit, a frequency divider circuit which frequency divides said output by 1/M, wherein M is an integer, to generate a plurality of carrier wave signals mutually out of phase, a plurality of modulator circuits for modulating said plurality of carrier wave signals by said position signals, an adding circuit for adding the outputs of said modulator circuits, a phase locked loop circuit which frequency multiplies the fundamental frequency component of the added output of said adding circuit by M, a phase comparator which compares phases between the multiplied output of a voltage-controlled oscillation circuit in said phase locked loop circuit and the reference frequency output of said reference frequency generating circuit, a low-pass filter for filtering a low frequency component of said output of said phase comparator, a waveform shaping circuit which shapes the output of said low-pass filter so as to generate a rectangular waveform pulse, and a position counter which counts said rectangular waveform pulse and digitally detects the position of said second member.

3. A brushless linear servomotor according to claim 1, wherein said first member does not include a permanent magnet as the component for a motor magnetic circuit and said second member includes a permanent magnet and at least two magnetic cores comprising said permanent magnets in layers.

4. A brushless linear servomotor comprising:
a first member provided at the surface thereof with magnetic teeth comprising a large number of teeth-like salients and slots arranged lengthwise of said first member at regular pitches, said magnetic teeth being formed on a cylindrical plane of said surface;
a second member movable along said first member and lengthwise thereof and relative thereto and having at least one magnetic cores, said second member comprising magnetic teeth groups engraved on said magnetic cores at the surfaces thereof opposite to said first member, a plurality of coils wound around said magnetic cores, and a guide means which keeps a constant gap between said magnetic cores and said first member to allow said second member to move smoothly relative to said first member;
a plurality of non-contact detectors which are connected to said second member, and which detect said salients and slots of said magnetic teeth of said first member and convert the detected results into electric signals so as to thereby output position signals of sine wave form which are different from each other;
an electronic commutator means for energizing said plurality of coils in the order according to said position signals;
an electronic scale means which electronically measures the position of said second member relative to said first member by demodulating phase information from a carrier wave signal modulated by said position signals; and
a motor driving circuit which extracts a difference between the output of said electric scale means and the input of position command and provides a current to said plurality of coils according to the magnitude of said difference so as to thereby allow said second member to move relative to said first member.

5. A brushless linear servomotor according to claim 4, wherein said electronic scale means comprises a reference frequency generating circuit, a frequency divider circuit which frequency divides said output by 1/M, wherein M is an integer, to generate a plurality of carrier wave signals mutually out of phase, a plurality of modulator circuits for modulating said plurality of carrier wave signals by said position signals, an adding circuit for adding the outputs of said modulator circuits, a phase locked loop circuit which frequency multiplies the fundamental frequency component of the added output of said adding circuit by M, a phase comparator which compares phases between the multiplied output of a voltage-controlled oscillation circuit in said phase locked loop circuit and the reference frequency output of said reference frequency generating circuit, a low-pass filter for filtering a low frequency component of said output of said phase comparator, a waveform shaping circuit which shapes the output of said low-pass filter so as to generate a rectangular waveform pulse, and a position counter which counts said rectangular waveform pulse and digitally detects the position of said second member.

* * * * *